United States Patent [19]

Scata et al.

[11] Patent Number: 5,085,310
[45] Date of Patent: Feb. 4, 1992

[54] SORTING UNIT FOR BELT CONVEYOR PLANTS

[75] Inventors: Mario Scata; Adolfo Passero, both of Teramo, Italy

[73] Assignee: MPA-Meccanizzazione Postale e Automatione SpA, Teramo, Italy

[21] Appl. No.: 223,202
[22] PCT Filed: Oct. 31, 1987
[86] PCT No.: PCT/EP87/00648
§ 371 Date: Jun. 28, 1988
§ 102(e) Date: Jun. 28, 1988
[87] PCT Pub. No.: WO88/03508
PCT Pub. Date: May 19, 1988

[30] Foreign Application Priority Data

Nov. 6, 1986 [IT] Italy ............................ 23610 B/86

[51] Int. Cl.⁵ ............................................. B65G 47/46
[52] U.S. Cl. ................................... 198/369; 198/463.3; 198/631
[58] Field of Search .................... 198/369, 463.3, 631, 198/817, 861.5; 414/790.5, 794.2; 209/698

[56] References Cited

U.S. PATENT DOCUMENTS

| | | | |
|---|---|---|---|
| 3,312,357 | 4/1967 | Stephens et al. | 214/6 |
| 3,404,775 | 10/1968 | McClellan | 209/111.6 |
| 3,520,396 | 7/1970 | Lingg | 198/631 |
| 3,848,725 | 11/1974 | Toby | 414/790.5 |

FOREIGN PATENT DOCUMENTS

| | | |
|---|---|---|
| 824402 | 12/1951 | Fed. Rep. of Germany . |
| 56719 | 6/1967 | Fed. Rep. of Germany . |
| 2631461 | 2/1977 | Fed. Rep. of Germany . |
| 2481959 | 11/1981 | France . |

Primary Examiner—Joseph S. Valenza
Attorney, Agent, or Firm—Sughrue, Mion, Zinn, Macpeak & Seas

[57] ABSTRACT

Sorting unit (1) for belt conveyor plants, of the type comprising a first sorting conveyor belt (7) extending between first transmission rollers (11) and revolvingly oscillating around a first oscillation axis (X-Y), extending in parallel and close to one of its longitudinal edges. A second sorting belt (8) is also provided, which extends between second transmission rollers (12) and is placed aside the first sorting belt at the opposite side to the first oscillation axis, as well as revolvingly oscillating around a second oscillation axis (X'-X') running in parallel and in correspondence of its longitudinal edge placed at the opposite side with respect to the first sorting belt.

12 Claims, 2 Drawing Sheets

SORTING UNIT FOR BELT CONVEYOR PLANTS

BACKGROUND OF THE INVENTION

This invention refers to a sorting unit for belt conveyor plants of the type comprising a first sorting conveyor belt extending among first transmission rollers and revolvingly oscillating around a first oscillation axis extending in parallel and close to one of its longitudinal edge, first actuating means to actuate the first sorting belt and first control means to rotate the first sorting belt around the first oscillation axis, bringing it from a rest position, where it lays horizontally, flush with further conveyor belts belonging to said sorting plant, to a delivery position, where it is transversally sloping and vice versa.

As it is known, belt conveyor plants generally comprise one or more main conveyor lines consisting of consecutive conveyor belt chains, along which sorting units, which can be singly and selectively operated, are interposed in order to properly sort the objects transported by the main conveyor line on different secondary lines.

There are nowadays different kinds of sorting units, each one satisfying specific needs, deriving for instance, from the number and the disposition of secondary conveyor lines on which objects must be sorted. As an example, a known type of sorting unit is basically composed by a flap which oscillates around an horizontal axis, parallel to the longitudinal development of the main conveyor line. The objects carried by this conveyor line should selectively fall on a first and on a second secondary conveyor line, placed below the main line, depending on the position of the flap.

Another known type of sorting unit is represented by a conveyor belt placed downstream a main conveyor line after interposition of a chute.

This conveyor belt extends perpendicularly with respect to the longitudinal development of the main conveyor line, and can be selectively operated in the opposite direction to deviate the objects there conveyed by the chute on secondary conveyor lines, developing in opposite direction, consecutively to the belt itself.

Sorting units, consisting of a conveyor belt extending on the continuation of the main conveyor line and revolving on one of its sides to selectively address the objects to two different secondary conveyor lines, have also been realized. From what has been briefly described, it can be noted that all sorting units known up to now, originate different problems when the corresponding conveyor plant is used to transport and sort, for instance, folded clothings, magazines, or in any case soft objects which shall maintain a predetermined configuration and orientation.

It is easy to imagine, in fact, that a folded blouse or a similar article of clothing, if not adequately packed up in a rigid box, as it is frequently the case, upsets and rolls itself up when it drops from the sorting unit on the secondary conveyor line or, this occurs when the objects fall from the main conveyor line on the sorting unit, if the sorting unit itself is composed by a conveyor belt which can be operated in the two directions.

This drawback is due to the fact that in all sorting units known at present, the object transported is compelled to drop on the corner on the secondary conveyor line or on the sorting unit, or to strike against the surfaces of these latter with a certain angle.

SUMMARY OF THE INVENTION

Problems similar to the above mentioned one arise when a sorting unit must send folded clothings or soft objects directly to boxes prearranged under it. In this situation the object of this invention is to solve all the above mentioned drawbacks with a sorting unit by which the objects coming from a conveyor line can be made opportunely dropped on another conveyor line or in a container prearranged downstream the sorting unit itself.

Another object of the present invention is that this sorting unit can easily be aligned with sorting units of the same kind to form multiple sorting stations.

All but last object of this invention is that this sorting unit can easily be realized in the sector industry.

These objects, and others still, which will become more apparent hereinafter, are basically attained by a sorting unit for belt conveyor plants, of the type comprising a first sorting conveyor belt extending among first transmission rollers and revolving around a first oscillation axis extending in parallel and close to one of its longitudinal edge, first actuating means to actuate the first sorting belt, first control means to rotate the first sorting belt around the first oscillation axis bringing it from a rest position, in which it lays horizontally flush with other conveyor belts being part of said sorting plant, to a delivery position where it is transversally sloping and viceversa, characterized by the fact that it comprises a second sorting belt extending among second transmission rollers and placed aside the first sorting belt at the opposite side of the first oscillation axis, as well as revolvingly oscillating around a second oscillation axis extending in parallel and in correspondence of its longitudinal edge positioned at the opposite side with respect to the first sorting belt, second actuating means to actuate said second sorting belt in the same direction and at the same speed of the first sorting belt and second control means to rotate the second sorting belt around the second oscillation axis bringing it from a rest position, in which it lays horizontally flush with said further conveyor belts, to a delivery position, in which it is transversally sloping, and viceversa, said first and second control means simultaneously operating on respective sorting belts, these latter being symetrically aligned with respect to further conveyor belts.

BRIEF DISCRIPTION OF THE DRAWINGS

Further characteristics and advantages shall better appear from the detailed description of a preferred, but not exclusive, embodiment of a sorting device for belt conveyor plants according to this invention, made hereinafter with reference to the accompanying drawings, given for indicative and not exclusive purposes, in which.

DETAILED DESCRIPTION OF THE INVENTION

With reference to the above mentioned figures, 1 indicates as a whole a sorting unit for belt conveyor plants, according to the present invention.

Figure 1:
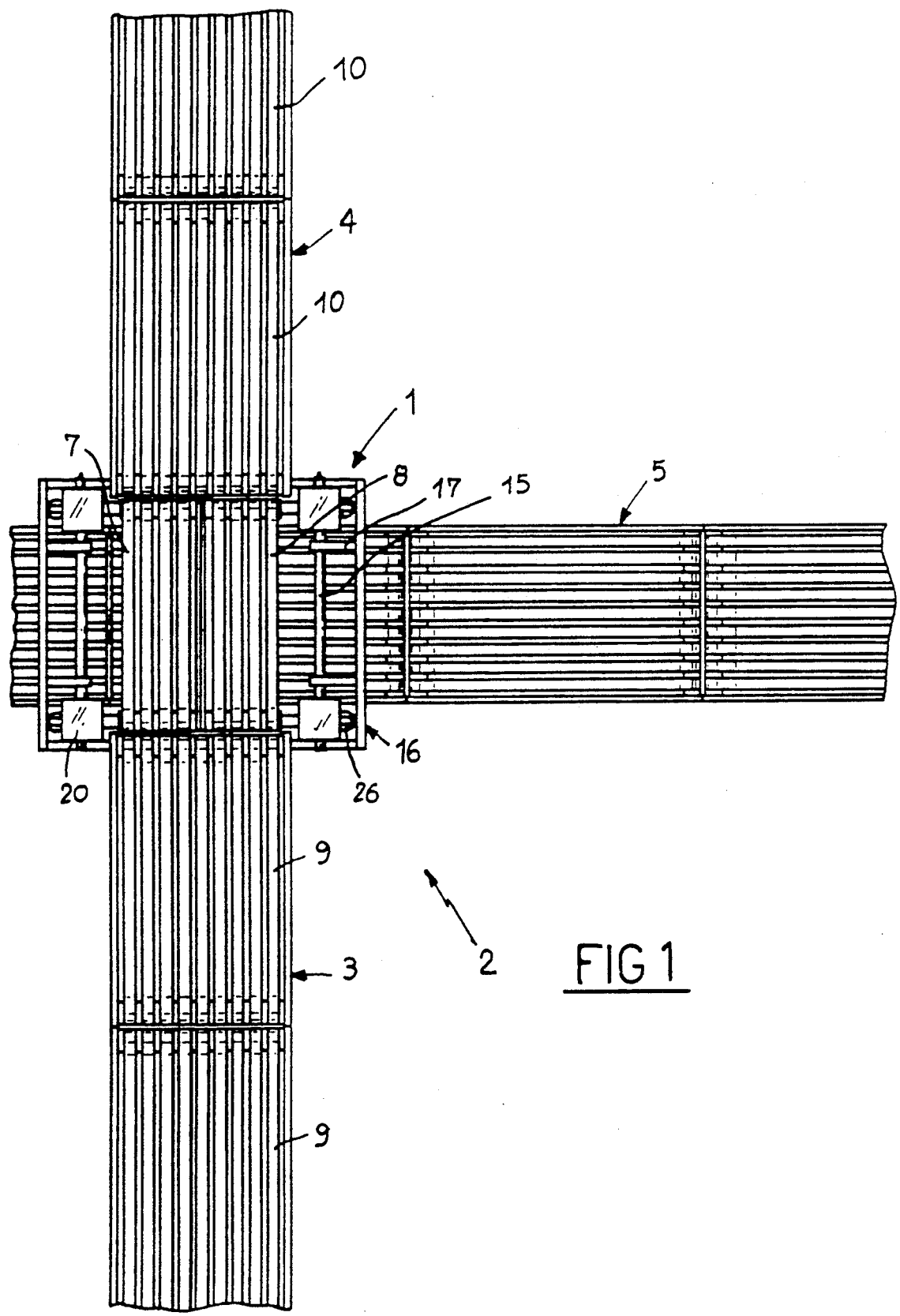
FIG. 1 shows a schematic and interrupted plan view of a conveyor plant provided with a sorting unit according to the invention.

As it appears from FIG. 1, the sorting unit 1 is part of a belt conveyor plant marked 2, and it can be interposed between a main conveyor line 3 and two secondary conveyor lines. More in particular the sorting unit 1 operates, as it will be better clarified hereinafter, in such a way as to send the objects coming from the main conveyor line 3, in a selective way, to a first secondary conveyor line 4, extending in line and coplanar with the main line 3, or on a second secondary conveyor line 5 extending according to a plan placed below the main conveyor line 3.

The number and the disposition of the secondary conveyor lines is not relevant for the objects of the present invention. In fact, as it appears from FIG. 3, it can be foreseen that instead of the second secondary conveyor line 5, a packing box 6 or the like be prearranged under the sorting unit 1, in such a way that this latter can make the objects coming from the main line 3 dropped directly into the same.

Originally, according to this invention the sorting unit 1 includes a first sorting conveyor belt 7 and a second sorting conveyor belt 8, one at the side of the other and symetrically extending in line with further conveyor belts 9 and 10, presented respectively by the main conveyor line 3 and by the first secondary conveyor line 4.

Preferably it is foreseen that the sum of widths of the sorting belts 7 and 8 is equal to the widths of conveyor belts 9 and 10.

As it is known, the sorting belts 7 and 8 are composed by a plurality of belt elements 7A and 8A extending, respectively, between first and second transmission rollers 11 and 12.

Figure 3:
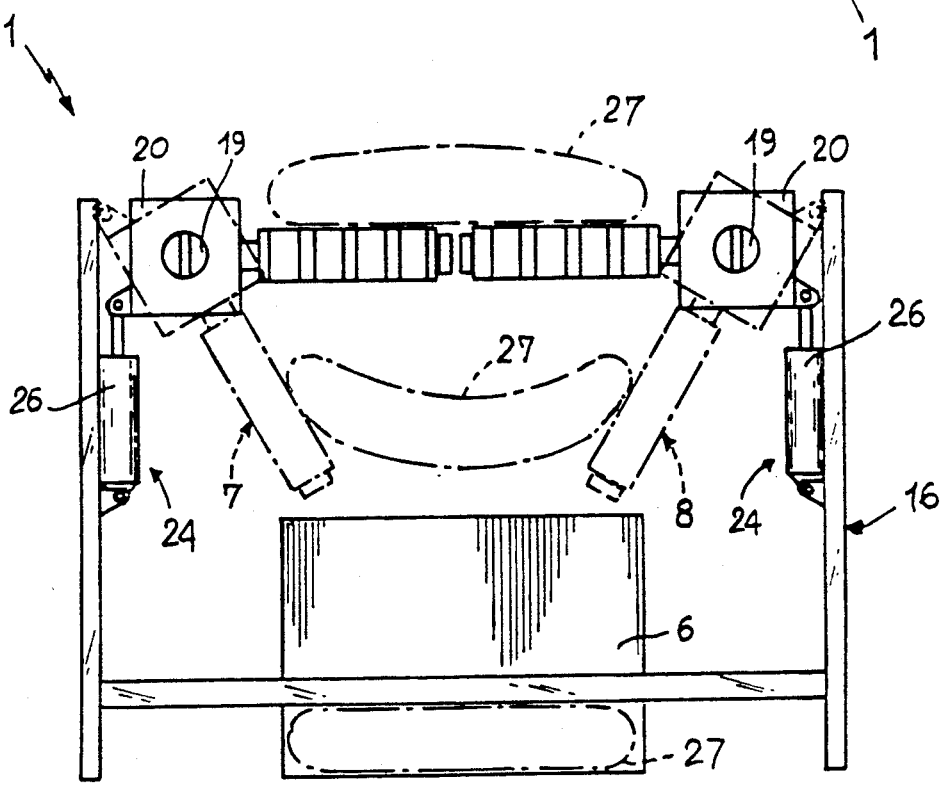
FIG. 3 is a frontal view of the sorting unit.

The sorting belts 7 and 8 are furthermore oscillating according to a first and a second oscillation axis X—X and X'—X' respectively, extending in parallel and in correspondence of the opposite edges of the same, to be brought, as it shall be better clarified hereinafter, from a rest position in which they are horizontally positioned in line with further conveyor belts 9 and 10, to a discharge position where, as indicated with a dotted line in FIG. 3, they are transversally tilted downward to let the carried objects drop into box 6 or on the secondary conveyor line 5.

In addition, first and second operation means 13 and 14 are foreseen which operate on the first sorting belt 7 and on the second sorting belt 8 respectively, as to give, through one of the transmission rollers 11 and 12, a conventional translatory conveying motion in the same direction to the belts.

Originally, the operation means 13 and 14 are made each one of an operation shaft 15 extending in parallel to the longitudinal development of the respective sorting belt 7 or 8, adjacent to its farest side with respect to the other sorting belt. To this purpose, each operating shaft 15 is revolvingly supported, with respect to a fixed structure 16, by supporting elements 17 clamped to the fixed structure itself. In preference it is foreseen that each operation shaft 15 is operated in rotation in the direction of the rotation made by the relevant sorting belt 7 or 8 when this latter is brought from the rest position to the discharge position, for the purposes which will better appear hereinafter.

The rotary motion of the operation shafts 15 can be obtained through transmission gears which can be associated to each one of the shafts in correspondence of half part of the flexible coupling 18 and 19 placed respectively at the opposite ends of these latter. These transmission members can be operated both by an engine associated to the sorting module 1 and by the main 3 or secondary 4 conveyor lines. Both the transmission members and the engine, mentioned above have not been illustrated and they will no more be described as known per se and conventional and in any case not decisive with a view to the present invention.

To advantage, the half-parts of flexible couplings 18 and 19 allow also the motion transmission among the operation shafts of several sorting units 1 when these are aligned in sequence in order to sort the objects on several secondary lines or in different containing boxes.

Each one of the operation shafts 15 revolvingly supports a couple of connection elements 20 each one of which, in its turn revolvingly supports one of the transmission rollers 11 or 12 at one of its ends.

Two bars 21 revolvingly engage the transmission rollers 11 and the transmission rollers 12 respectively, from the opposite side at their ends engaged by the connection elements 20.

Figure 2:
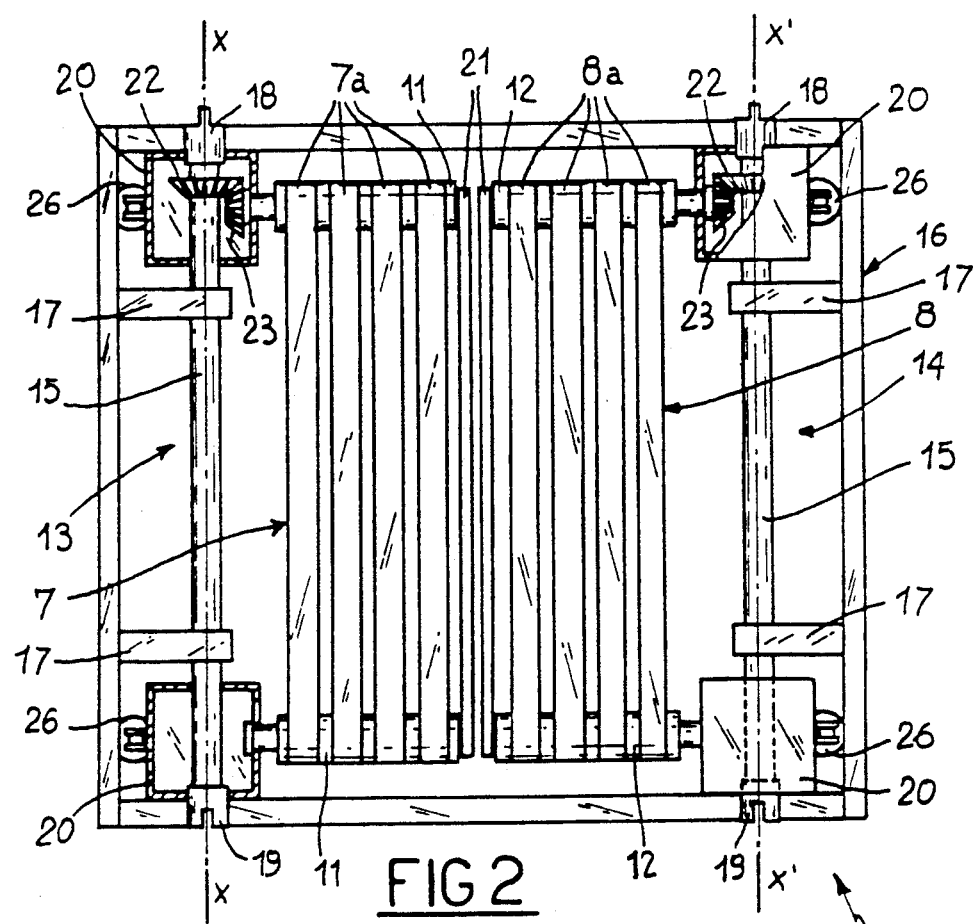
FIG. 2 shows a top view of the subject sorting unit.

Each operation shaft 15 transmits the motion to the relevant sorting belt 7 or 8 through at least a couple of conic gears 22 and 23 respectively keyed on the shaft 15 and on one of the transmission rollers 11 and 12. As it can be noticed from FIGS. 2 and 3, it is preferably foreseen that connection elements 20 have a box-shaped configuration, in such a way that gears 22 and 23 can be accomodated inside the same.

To the sorting belts 7 and 8 are furthermore associated the first and second control means 24 and 25 respectively, simultaneously operating so as to bring the relevant sorting belts 7 and 8 from the rest to the delivery position and viceversa.

In a preferred embodiment it is foreseen that these control means include each one at least a fluid-dynamic cylinder 26 engaged to the fixed structure 16 and operating on one of the connection elements 20. In the case shown, two of these fluid-dynamic cylinders 26 each one operating on the relevant connection elements 20 are foreseen on each sorting belt 7 and 8. If it were foreseen only one fluid-dynamic cylinder 26 for each sorting belt, connection elements 20 must be rigidly connected one to each other so as to be simultaneously operated by the fluid-dynamic cylinder 26.

After what has been described in a mainly structural meaning, the operation of the sorting unit according to the invention is the following. When in rest position, sorting belts 7 and 8, operated by the relevant operation shafts 15, form a continuous surface with the conveyor belts 9 and 10, in such a way that the objects coming from the main conveyor line 3 can be brought on the first secondary conveyor line 4.

The positioning of the sorting belts 7 and 8 with respect to the main conveyor line 3 is arranged in such a way that the objects carried along the sorting unit 1 result supported by both belts 7 and 8 substantially by two symetrically opposed portions. This situation is clearly shown in FIG. 3 in which one of these objects has been represented with a dotted line and marked with number 27.

When the object 27 translating on the sorting unit 1 is to be made dropped on the second secondary conveyor line 5 or in the box 6, fluid-dynamic cylinders 26 are simultaneously operated by known and conventional means.

These ones, acting on connection elements 20, force sorting belts 7 and 8 to rotate downward around the axis of the relevant operation shafts 15, which represent the first and the second oscillation axis X—X and X'—X', respectively. By this rotation, belts 7 and 8 take the delivery position and the object 27 is therefore subject to drop on the secondary conveyor line 5 or in the box 6, as shown in FIG. 3.

To advantage, as it easy to think, the immediate and simultaneous lowering of the surfaces carrying the object 27 allows that this maintains a substantially horizontal oritentation during its free fall.

In this way, even if the object is for instance an article of clothing or in any case an easily deformable element it is not subject to get upset or to curl up upon the impact with the surface under the sorting unit.

This effect is reached thanks to the motion transmission through gears 22 and 23, belts 7 and 8 are subject to slow down the carrying speed of the object 27 when they are brought from the rest position to the discharge position.

This speed can even be nullified acting in such a way that fluid-dynamic cylinders 26 give to the relevant sorting belts 7 and 8 an angular velocity equal to that of the operation shafts 15.

Immediately after that the object 27 has dropped, sorting belts 7 and 8 are automatically brought again, always through the fluid-dynamic cylinders 26, in the rest position to receive a new object from the main conveyor line 3.

This invention so attains the proposed objects. As it appears from what above stated, the subject sorting unit operates in such a way as to make the object dropped in the fittest way as to avoid, at the moment of the impact, impact forces localized on certain points of the object itself, which would tend to cause a deformation of the same. This makes the sorting module 1 adequate to sort also soft objects; this could not be obtained in a satisfactory way with the utilization of sorting units of the known type.

The subject sorting unit is furthermore easy to carry out by the sector industry and shows a high utilization versatility since it can easily be applied to conveyor plants of any type. Naturally, a number of modifications and variations can be made to this invention, without leaving the inventive concept characterizing it.

For example, the operation shafts and the gears can be replaced by conventional belt and pulley transmission usually employed in conveyor plants. In this case, it would be waved the advantage to obtain a slowing down or evenly a cancellation of the object transport speed when sorting belts are brough from the rest position to the delivery one. Fuild-dynamic cylinders 26 can furthermore be replaced, e.g. by coupling joints installed on the operation shafts 15 and operating in such a way as to make the connection elements 20 temporarily integral with the shafts to obtain the lowering in the sorting belts 7 and 8.

We claim:

1. A sorting unit for belt conveyor plants, of the type comprising a first sorting conveyor belt extending among first transmission rollers and revolvingly oscillating around a first oscillation axis, said axis extending in parallel and close to a longitudinal edge of said first sorting belt, first actuating means to actuate the first sorting belt during at least a part of a sorting operation and oscillation axis, bringing it from a rest position, where it lays horizontally flush with other conveyor belts being part of said sorting plant, to a delivery position where it is inclined with respect to said other conveyor belts, and vice versa, characterized in that said sorting unit comprises a second sorting belt extending among second transmission rollers and placed adjacent the first sorting belt at a side thereof opposite said longitudinal edge of said first sorting belt, as well as revolvingly oscillating around a second oscillation axis running in parallel and close to a longitudinal edge of said second sorting belt opposite the first sorting belt, second actuating means to actuate said second sorting belt in the same direction and at the same speed as the first sorting belt during said part of a sorting operation, and second control means to rotate the second sorting belt around the second oscillation axis bringing it from a rest position in which it is horizontally flush with said other conveyor belts, to a delivery position in which it is inclined with respect to said other conveyor belts, and vice versa, said first and second control means simultaneously operating on the relevant sorting belts during said part of said sorting operation, these latter being symmetrically aligned in respect with further conveyor belts.

2. A sorting unit according to claim 1, characterized in that said sorting belts are transversally tilted downward when in their delivery position.

3. A sorting unit according to claim 1, characterized in that said actuating means comprise for each one of said sorting belts, at least one operation shaft activated in rotation, revolvingly supported with respect to a fixed structure, and having its own axis coinciding with the oscillation axis of the respective sorting belt, at least a couple of conic gears keyed, respectively, on the corresponding operation shaft and on one of said transmission rollers, as well as operatively engaged with each other, and at least two connection elements revolvingly engaged on the relevant operation shaft, each one of said elements revolvingly engaging a transmission roller of the corresponding sorting belt.

4. A sorting unit according to claim 3, characterized in that said control means include, for each one of said sorting conveyor belts, at least two fluid-dynamic cylinders engaged on said fixed structure and operating each on one of said connection elements.

5. A sorting unit according to claim 3, characterized in that said control means include, for each one of said sorting belts, a fluid-dynamic cylinder engaged on said fixed structure and operating on one of said connection elements, the latter being rigidly engaged with each other.

6. A sorting unit according to claim 3, characterized in that each one of said operation shafts rotates in the direction of rotation of the relevant sorting belt when this latter is brought from the rest position to the delivery position by the respective control means.

7. A sorting unit according to claim 6, characterized in that said control means make the respective sorting belt rotate around the corresponding oscillation axis at an angular velocity equal that of said operation shaft.

8. A sorting unit according to claim 3, characterized in that each one of said operation shafts is equipped with at least two half-parts of flexible couplings supported on its opposed ends.

9. A sorting unit according to claim 1, characterized in that the sum of widths of said sorting belts is substantially equal to the width of said other conveyor belts.

10. A sorting unit according to claim 3, characterized in that said control means include, for each one of said sorting conveyor belts, at least two fluid-dynamic cylinders engaged on said fixed structure and operating each on one of said connection elements.

11. A sorting unit according to claim 3, characterized in that said control means include, for each one of said sorting belts, a fluid-dynamic cylinder engaged on said fixed structure and operating on one of said connection elements, the latter being rigidly engaged with each other.

12. A sorting unit according to claim 3, characterized in that each one of said operating shafts rotates in the direction of rotation of the relevant sorting belt when this latter is brought from the rest position to the delivery position by the respective control means.

* * * * *